United States Patent [19]

Strasser et al.

[11] Patent Number: 4,874,050

[45] Date of Patent: Oct. 17, 1989

[54] PORTABLE DECK TRUCK SCALE

[75] Inventors: Thomas F. Strasser; Herbert L. Stott, both of Meridian, Miss.

[73] Assignee: Fairbanks Inc., Kans.

[21] Appl. No.: 271,992

[22] Filed: Nov. 15, 1988

[51] Int. Cl.[4] ........................ G01G 19/02; G01G 21/22
[52] U.S. Cl. .................................... 177/134; 177/253
[58] Field of Search ............... 177/134, 135, 253, 211

[56] References Cited

U.S. PATENT DOCUMENTS

| 3,935,913 | 2/1976 | Wagner et al. | 177/134 |
| 4,466,501 | 8/1984 | Karpa I | 177/134 |
| 4,529,051 | 7/1985 | Stolz et al. | 177/134 |
| 4,592,435 | 6/1986 | Karpa II | 177/253 X |

FOREIGN PATENT DOCUMENTS

| 0234927 | 4/1986 | Fed. Rep. of Germany | 177/253 |
| 57-82720 | 5/1982 | Japan | 177/134 |

Primary Examiner—George H. Miller, Jr.
Attorney, Agent, or Firm—Sixbey, Friedman, Leedom & Ferguson

[57] ABSTRACT

The portable deck truck scale includes a deck structure which has a plurality of "V"-shaped support ribs extending between a bottom plate and an upper deck. The support ribs are configured to provide increased strength at the side portions of the deck structure, and the upper deck is either a metal plate or a concrete slab. If a metal plate forms the upper deck, the central portion is reinforced by spaced strips positioned over the side portions of the deck. When the deck is concrete, it has a thickness within the range of from 2 to 4 inches. This is achieved by adding silica fume and steel fibers to the concrete mix. The deck structure is supported on a load cell beam having a flat upper surface which supports the flat surface of a load button. An opposed radiused surface of the load button supports the flat end surface of a rocker pin which engages the deck structure.

18 Claims, 3 Drawing Sheets

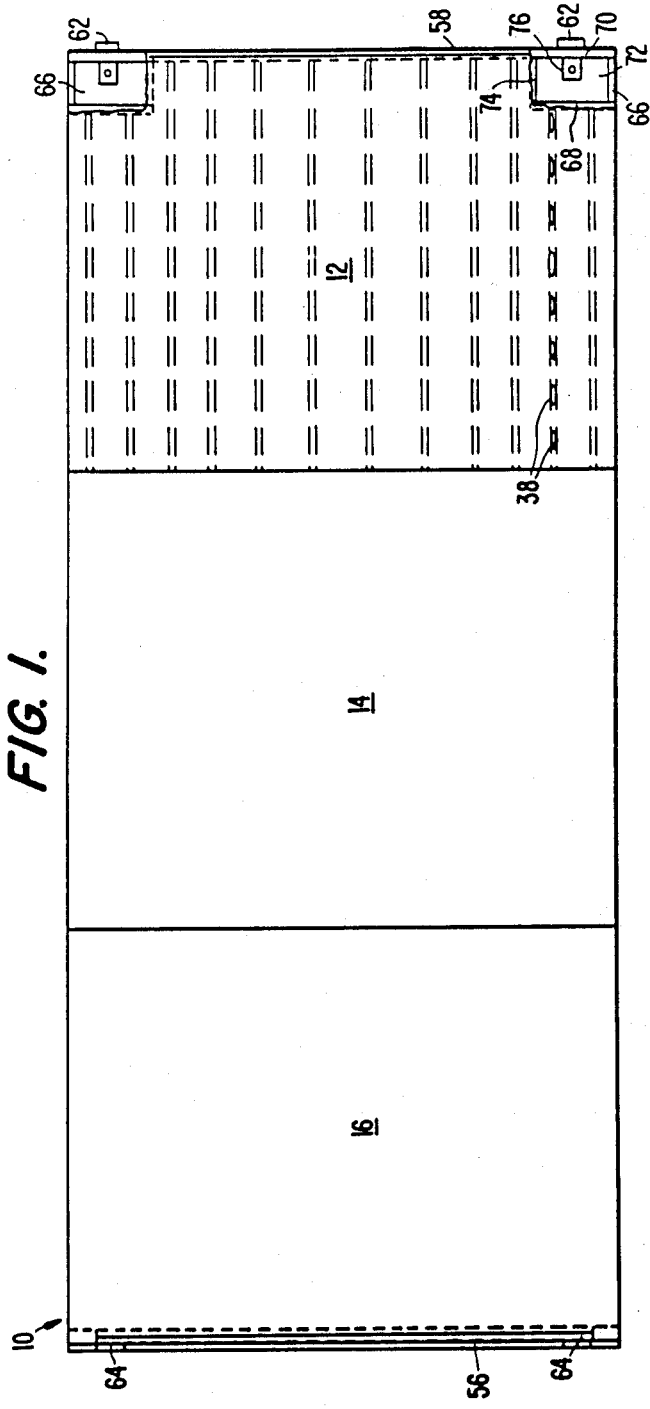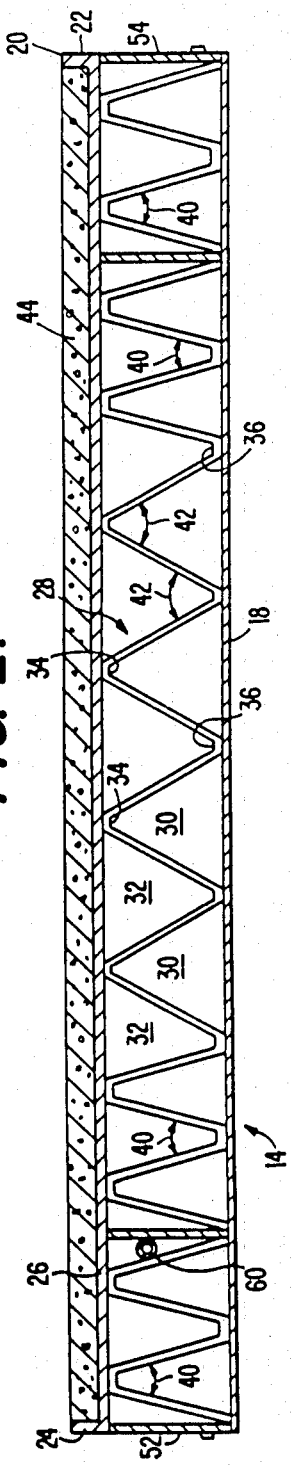

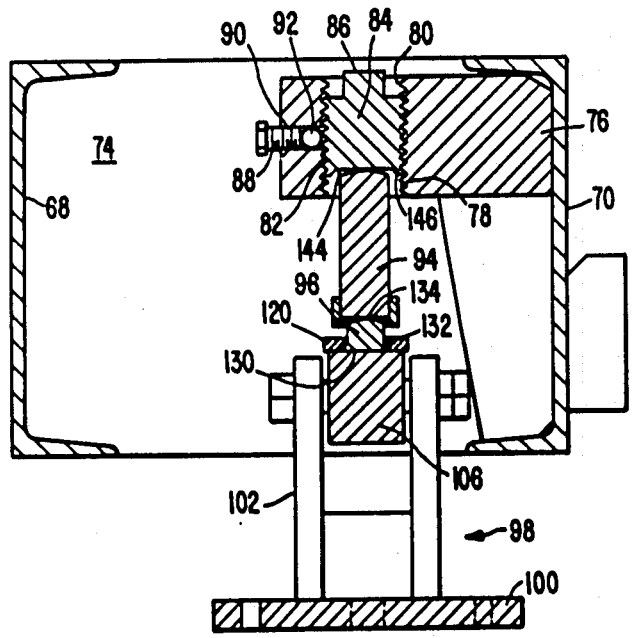
FIG. 6.
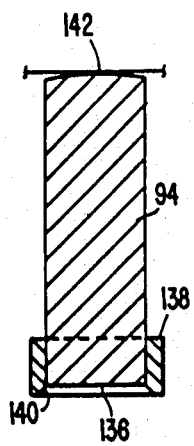
FIG. 7.
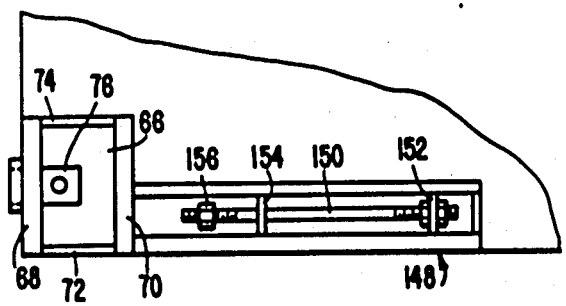
FIG. 8.
FIG. 9.
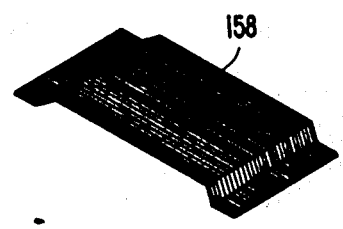
FIG. 10.
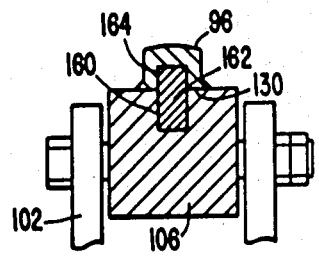

PORTABLE DECK TRUCK SCALE

TECHNICAL FIELD

The present invention relates to truck scales generally, and more particularly to an improved truck scale assembly having strong, relatively lightweight deck sections which may be preassembled and moved by rail or truck to a scale site.

BACKGROUND

The weighing of heavy vehicles, such as cargo carrying trucks, presents a number of unique scale design problems. For example, a conventional truck scale is normally an outdoor installation which is exposed not only to the elements, but also to weights of substantial magnitude, shock caused by heavy moving vehicles engaging the scale deck, and the infiltration of abrasive chemicals, such as road salts, commonly found in a highway environment. In fact, a truck scale deck, which bridges an underlying scale pit, is subjected to a concentration of the same forces which cause the deterioration of highway surfaces that are supported by solid beds.

In the past, truck scales have been designed with heavy scale beams mounted in pits which were bridged by massive deck structures adapted to withstand the weight of loaded trucks while providing some protection to the underlying scale mechanism. The sheer mass involved in these assemblies required that the components of both the scale mechanism and the scale deck be individually shipped to the scale site where the scale was actually assembled on site from these components.

With the advent of electronic load cells capable of operation under the loads to which a truck scale is subjected, scale pits became shallower and much of the massive scale mechanism previously mounted within the pit was eliminated. This reduced the volume of heavy components shipped to the scale site as well as the time required to build a truck scale at the site, but the requirement for a massive scale deck was not reduced. In fact, forming these heavy decks on site and adapting them for effective mounting on load cells rather than supporting weigh beams created additional problems to be solved.

As cargo carrying highway trucks have become longer and designed to provide a greater cargo carrying capacity, truck scale decks have likewise been developed to provide enhanced strength and shock resistance. Many steel and concrete truck scale decks are supported on massive spaced beams which extend beneath each deck section. More recently with concrete decks, profiled metal sheets with "V"-shaped corrugations which extend transversely under the deck have been provided to receive the concrete, as illustrated by U.S. Pat. No. 4,392,537 to Lundborg. To further increase the strength of these structures, the corrugated bottom surface which engages the concrete of the deck has been formed with anchors which extend into the concrete as illustrated by U.S. Pat. No. 4,529,051 to Stolz et al. Although these corrugated support units which provide a bottom structure into which concrete is poured enhance the overall strength of the resultant concrete deck, they do little to simplify the problems involved in fabricating the deck on site and then mounting a massive deck structure on supporting load cells.

Ideally, it would be desirable to prefabricate completed relatively lightweight metal or concrete deck sections designed to mate with an underlying load cell assembly which interlock to form an elongate scale deck, and to then ship these preformed sections to a scale site for assembly. To make this feasible, the sections would need to be sufficiently light so that shipping costs would not be prohibitive, and yet sufficiently strong to withstand the rigors of a truck scale environment. For a concrete deck scale, the concrete deck could only be a few inches thick if shipping is to be economically feasible, and yet this deck must be sufficiently dense and strong to preclude the infiltration of road salts and moisture. The necessity to meet these requirements has, to this point, precluded the prefabrication of steel and concrete truck scale decks with their underlying support structures and economic feasibility has mandated that these decks be poured and/or built at a scale site. This is a time consuming process which requires the presence of a number of trained personnel at the scale site.

DESCRIPTION OF THE INVENTION

It is a primary object of the present invention to provide a novel and improved portable deck truck scale wherein a lightweight scale deck of either concrete or steel, with an underlying support structure, can be prefabricated and economically shipped to a scale site.

Another object of the present invention is to provide a novel and improved portable deck truck scale wherein interlocking deck sections are formed to cooperate with a simple load cell mounting structure to facilitate the mounting and adjustment of the scale deck on the load cells. The load cells and the deck mounting assembly are designed to eliminate machining of mounting structures on the load cells and the resultant requirement for precise alignment of the cell and mounting assembly.

Yet another object of the present invention is to provide a novel and improved portable deck truck scale which incorporates scale deck sections having either a concrete or steel surface supported by a longitudinally extending, lightweight "V" beam structure designed to provide enhanced strength in areas subjected to the maximum shock and force.

A further object of the present invention is to provide a novel and improved portable deck truck scale wherein corrugated "V"-shaped support beams extend longitudinally of the scale deck sections to support the deck. The apex angles of the "V"-shaped support beams are smaller adjacent the outer edges of the scale deck to enhance the strength of the deck in these areas.

Another object of the present invention is to provide a novel and improved portable deck truck scale having a corrugated "V" beam support structure and a concrete surface which is formed of a densified concrete mixture reinforced with metal fibers and which is only a few inches thick.

A still further object of the present invention is to provide a novel and improved portable deck truck scale having a scale deck which is prefabricated with load cell mounts which cooperate with an adjustable load cell mounting assembly. A rocker pin and load button combination engage the flat surface of a load cell beam, and a split collar secures the load button to the beam.

These and other objects of the present invention include the provision of a portable deck truck scale having a plurality of interlocked deck sections, each of which is formed by upper and lower plates joined by longitudinally extending "V"-shaped support ribs. The angle at the apex of the support ribs adjacent the two outermost edges of a deck section is less than the apex angle of the remaining ribs to provide added strength at outer longitudinal sections of the deck where the wheels of a truck will pass. Double-plating extends longitudinally along each side of the deck over these outer longitudinal sections in the central portion of the deck to enhance side-to-side stability and to oppose the midspan bending stresses. At corners of a deck section there is provided a load cell mount for mounting the section on a flat upper surface of a load cell beam which bridges spaced supports secured to the ends thereof. A load button rests directly on the flat upper surface of each load cell beam and is surrounded by a split collar which is bolted to the beam. The lower beam contacting surface of the button is flat while the opposed upper surface is radiused to support the flat lower surface of an elongate rocker pin. This flat lower surface is surrounded by a pin collar having an outwardly angled inner diameter to hold the pin on the load button while permitting rocking movement therebetween. The rocker pin includes a radiused upper surface which engages the flat lower surface of a height adjusting screw bearing which is threaded into the load cell mount at a corner of a deck section.

For concrete deck scales, the upper plate for each deck section is formed by a metal tray into which concrete is poured to a thickness of between 2 to 4 inches. This concrete has been made dense and reinforced by adding a combination of silica fume and steel fibers to the mix.

BRIEF DESCRIPTION OF THE DRAWINGS

FIG. 1 is a plan view of the portable deck truck scale of the present invention with two corners cutaway to illustrate the load cell mounting structure;

FIG. 2 is a cross-sectional view of a concrete deck section for the portable deck truck scale of the present invention;

FIG. 6 is a sectional view of the load cell mounting assembly for the portable deck truck scale of the present invention;

FIG. 7 is a sectional view of the load rocker pin for the load cell mounting assembly of FIG. 6;

FIG. 8 is a cut-away view showing the load cell mounting structure and platform checking structure for the portable deck truck scale of FIG. 1; and FIG. 9 is a perspective view of the steel fibers used in the concrete for the concrete deck section of FIG. 2; and FIG. 10 is a sectional view of a second embodiment of a load button mounting structure for the portable deck truck scale of the present invention.

BEST MODE FOR CARRYING OUT THE INVENTION

Figure 3:
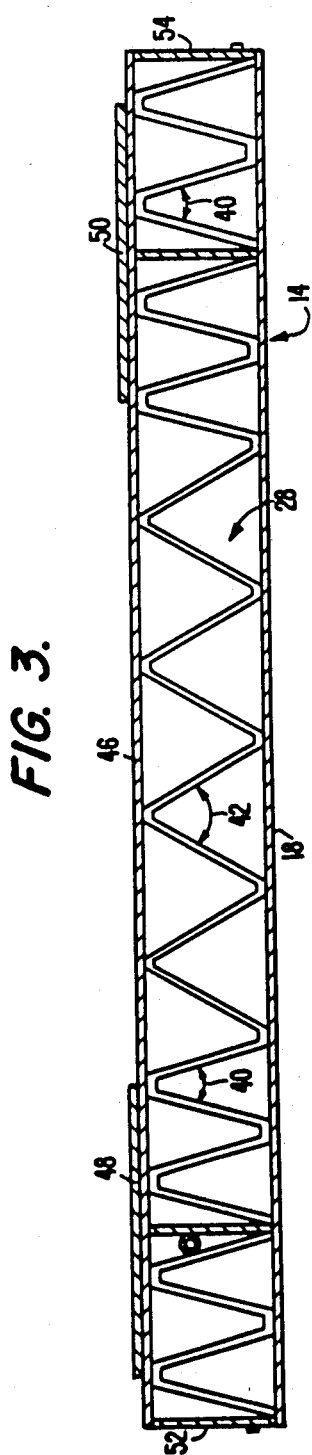
FIG. 3 is a cross-sectional view of the center section for the metal deck of the portable deck truck scale of the present invention.

Referring now to FIGS. 1–3, the portable deck truck scale of the present invention indicated generally at 10 is formed in a plurality of sections, with three sections 12, 14 and 16 being illustrated in FIG. 1. The basic construction of each scale section is substantially identical to that of all other scale sections for the truck scale 10 with the exception of a few structural variations to be subsequently described.

FIG. 2 shows the deck portion for scale section 14 wherein the surface of the deck is formed of concrete. The deck section of FIG. 2 includes a metal base plate 18, which, for example, may be a one-fourth inch steel plate, and spaced above the metal base plate is a sheet metal pan 20. This metal pan has sidewalls 22 and 24 and end walls, not shown, which extend upwardly from a bottom wall 26. The metal pan is supported in spaced relation to the base plate 18 by a plurality of interconnected, metal "V"-shaped support ribs indicated generally at 28. The support ribs are oriented to extend longitudinally of the scale sections 12, 14 and 16 and they are positioned to extend in side-by-side relationship across the width of each scale section. Since the "V"-shaped support ribs are interconnected, they divide the space between the metal base plate 18 and the bottom wall 26 of the sheet metal pan 20 into alternating "V"-shaped chambers 30 and 32 extending longitudinally of each scale section. Each such chamber is inverted with respect to the next adjacent chambers on either side thereof, and the "V"-shaped support ribs 28 form inclined chamber walls which extend from alternating apexes 34 and 36. The apexes 34 are positioned adjacent the bottom wall 26, while the intervening apexes 36 are positioned adjacent the metal base plate 18. It will be noted that the support ribs 28 are flattened at the apexes 34 and 36 so that the support ribs can be secured to the bottom wall 26 and to the base plate 18 at these flattened apex surfaces. This can be done with any conventional means of securement, but ideally, the support ribs are welded to the bottom wall 26 and the base plate. If the bottom wall and base plate are sufficiently thin, direct welds can be made without cutting through holes to expose the surfaces of the apexes 34 and 36. However, as illustrated in FIG. 1, if the bottom wall and base plate are thick, welding may be accomplished through small apertures 38 which are cut in the bottom wall and base plate. The position of the spaced welds which extend down the length of each apex are illustrated by closely spaced parallel lines in the section 12 of FIG. 1.

It is important to note that the apex angles for the support ribs 28 which are positioned adjacent the side portions on either side of each scale section are much smaller than the apex angles 42 of the "V"-shaped support ribs which are in the central portion of each scale section. This results in the provision of more "V"-shaped support ribs in the outer edge portions of each scale section than are found in the central portion of the scale section, thereby enhancing the weight bearing strength at the outer edge portions of the scale section. It is these outer edge portions which will bear the direct weight of truck tires passing over the individual scale sections.

In FIG. 2, a scale section 14 having a poured concrete deck 44 is illustrated, but as shown in FIG. 3, the concrete deck and sheet metal pan 20 can be replaced by an upper metal plate 46 which forms a metal deck for the scale section. The metal upper deck may be formed by a metal plate similar to the metal base plate 18, and the "V"-shaped support ribs are welded between the base plate 18 and the upper metal plate 46. Otherwise, the structure of FIG. 3 is substantially identical to that of FIG. 2, and it will be noted that the apex angles for the "V"-shaped support ribs adjacent the side edge portions of the scale section are smaller than those in the middle of the scale section. Also, when all three scale sections 12, 14 and 16 are provided with an upper metal deck, the central section 14 is provided with longitudinally extending reinforcing plate strips 48 and 50 which are secured to the metal deck 46 over the smaller outer ribs having the smaller apexes 40. Thus, there is double-plating in only the center section 14 over the smaller outer ribs in the central third of the scale platform to give better side-to-side stability to the platform under the wheel pattern for a vehicle being weighed. Also, this double-plating in the central third of the platform opposes the maximum bending stresses which occur at mid-span.

Each of the scale sections includes sidewalls 52 and 54 and end walls 56 and 58 which extend between the metal base plate 18 and either the sheet metal pan 20 or the upper metal plate 46 to enclose the ribs 28. In the internal chambers formed by the ribs, conduits 60 may be formed to carry electrical connectors for the portable deck truck scale 10. In a multi-section scale such as shown in FIG. 1, these conduits would extend through the entire scale platform, with the conduit in one section mating with a similar conduit in the next adjacent sections. To connect and align the sections, the end walls 58 of each section are provided with projecting lugs 62 which lock into sockets 64 formed in the end wall 56 of the next adjacent scale section. Of course, any other suitable means to lock the scale sections together may be provided.

It is often difficult to mount the relatively massive scale platform for a truck scale on underlying load cell supports. This is particularly true with load cells having pre-machined receptacles or depressions for the scale mounting elements. Not only must the load cell be machined in an additional operation, but then the mounting elements must be carefully aligned with the receptacle machined in the load cell. The portable deck truck scale 10 of the present invention incorporates a novel load cell and load cell mounting arrangement which greatly simplifies the mounting of the scale platform sections upon supporting load cells. As illustrated in FIGS. 1, 6 and 8, a platform mounting chamber 66 is formed in the corner area of each platform section. These platform mounting chambers may be formed in any desired configuration depending upon the overall scale structure. For example, there may be one platform mounting chamber formed at each of the four corners of each platform section, there may be platform mounting chambers formed at each of the four corners of only the platform sections for the scale sections 12 and 16, or there may be platform mounting chambers formed at only the two outermost corners of the platform sections for the scale sections 12 and 16. Each platform mounting chamber is essentially the same in structure, and is bounded by spaced end beams 68 and 70 joined by side beams 72 and 74. This beam structure is secured between the metal base plate 18 and either the sheet metal pan 20 or the upper metal plate 46 of a scale section, and defines an open platform mounting chamber which may be closed at the upper surface of the platform by a removable plate. Extending into this platform mounting chamber from an end beam 70 is a rigid mounting bracket 76 having a circular opening 78 extending therethrough. The internal surface 80 of the circular opening is threaded to engage the threaded outer surface 82 of a height adjustment bearing 84. The upper extremity of this height adjustment bearing is provided with a wrench engaging projection 86 which may be operated by a wrench or similar tool to thread the height adjustment bearing into the circular opening 78. Once the height adjustment bearing has been threaded to the desired height, a lock screw 88 is rotated into a threaded opening 90 which extends through the mounting bracket 76 into the circular opening 78 and is substantially perpendicular thereto. The lock screw engages a bearing 92 which in turn engages the surface of the height adjustment bearing 84 to lock this bearing in position.

Figure 5:
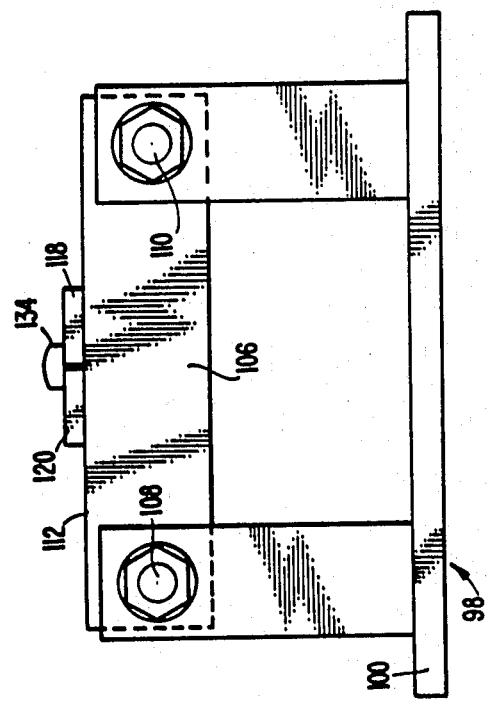
FIG. 5 is a view in side elevation of the load cell of FIG. 4.

As shown in FIG. 6, the height adjustment bearing 84 cooperates with an elongated rocker pin 94 and a load button 96 to mount the corner of a platform section for the portable deck truck scale 10 on a load cell 98. As will be noted from FIGS. 4, 5 and 6, the load cell 98 includes a base 100 which may be bolted to any suitable support for the portable deck truck scale 10. Extending upwardly from the base 100 at opposite ends thereof are pairs of spaced support brackets 102 and 104. Opposite ends of a load cell beam 106 are positioned between each pair of spaced support brackets 102 and 104 so that the load cell beam bridges the pairs of support brackets. The ends of the load cell beam are mounted on the spaced support brackets by transversely extending bolts 108 and 110 which extend through each pair of spaced support brackets and also transversely through the ends of the load cell beam 106. The load cell beam is provided with electrical strain gauges in a known manner so that deformation of the beam in response to forces applied thereto between the pairs of spaced support brackets 102 and 104 is sensed by the strain gauges.

Figure 4:
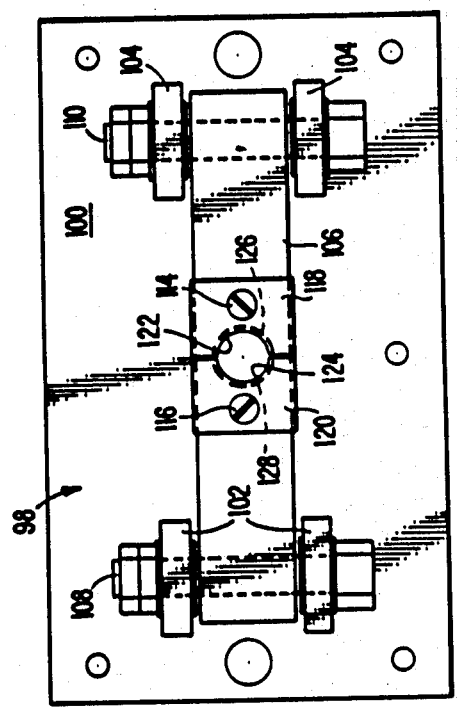
FIG. 4 is a plan view of a load cell for the portable deck truck scale of the present invention.

To this point, the structure of the load cell 98 is somewhat conventional, but generally, with cells of this type, a depression or socket is machined into the flat upper surface of the load cell beam 106 to mount a force applying element on the load cell beam. In accordance with the present invention, the load cell beam includes a flat upper surface 112 which is not machined in any manner, but instead includes threaded apertures, not shown, to receive two bolts 114 and 116. These bolts secure two split collar elements 118 and 120 to the flat upper surface of the load cell beam 106. The split collar elements are provided with an arcuate cut-away portion 122 and 124, and when these arcuate cut-away portions mate with the split collar elements in position on the load cell beam, they define a circular central opening as illustrated in FIG. 4. Each arcuate cut-away portion 122 and 124 is slightly enlarged adjacent the bottom surface of the split collar elements 118 and 120 as illustrated in broken lines at 126 and 128 in FIG. 4. These enlarged portions retain a flange on the bottom of the load button 96 in a manner illustrated by FIG. 6.

The load button 96 includes a flat bottom surface 130 which is positioned on the flat upper surface 112 of the load cell beam 106. Adjacent this flat bottom surface, the load cell button is provided with a laterally extending bottom flange 132, and to secure the load button to the load cell beam, the split collar elements 118 and 120 are placed around the load button so that the flange 132 extends into the enlarged portions 126 and 128 of the arcuate cut-away portions 122 and 124. The load cell button now projects upwardly through the central aperture defined by the split collar elements, and the bolts 114 and 116 may now be tightened to lock the split collar elements and the load button in place.

The upper surface of the load button 134 is not flat, but is instead radiused in a manner to be subsequently described in connection with the upper surface of the rocker pin 94. This radiused upper surface of the load button supports a flat bottom surface 136 for the rocker pin 94. To hold the flat bottom surface of the rocker pin on the radiused or slightly arcuate surface 134 of the load button 96, the rocker pin is provided with a surrounding collar 138 which extends outwardly beyond the flat lower surface 136. It will be noted that this outwardly extending portion of the collar 138 fits down around the top portion of the load button 96 and therefore prevents the rocker pin from slipping off of the load button. The internal surfaces of the collar 138 in the outwardly projecting portion are angled outwardly as indicated at 140 to increase the diameter of the collar in the area surrounding the load button. This permits both the rocker pin 94 and the collar 138 to have limited rocking movement on the radiused upper surface of the load button 96.

As is indicated in FIG. 7, the rocker pin 94 includes a radiused upper surface 142 which is rounded or arcuate in shape in the same manner as the radiused upper surface 134 of the load button 96. This radiused upper surface of the rocker pin engages a flat bottom surface 144 formed on the height adjustment bearing 84. It will be noted that the height adjustment bearing is provided with a downwardly extending peripheral flange 146 which extends around the flat lower surface 144 and which operates to retain the upper surface of the rocker pin 94 in contact with the surface 144 of the height adjustment bearing.

It will be noted from FIG. 6 that the combination of the arcuate upper surface of the load button 96 and the arcuate upper surface of the rocker pin 94 permits the rocker pin to universally pivot to a limited degree in all directions. Also, the use of the split collar formed from the collar elements 118 and 120 assures that there is no load transfer through this split collar to the load cell beam 106, and all loading of the load cell is provided by the load button 96. Since the load button has a flat end surface in contact with the load cell beam and an end flange which is covered by the split collar, there is no chance of dirt or grime filling the space between the load button and the load cell beam.

To control the horizontal movement of the scale platform and prevent tumbling of the rocker pins 94, each platform section may be provided with suitable motion checking assemblies 148. These assemblies are normally positioned adjacent to the platform mounting chambers 66, and one such assembly is illustrated in FIG. 8. Basically, this assembly consists of a check rod which is attached at one end to a bracket 152 secured to the scale platform section. The opposite end of the check rod passes freely through an aperture in a bracket 154 which extends upwardly from the load cell base 100 or from the support to which the base 100 is secured. The amount of platform motion permitted by the check rod 150 may be varied by varying the position of a nut 156 which is threaded onto the end of the check rod.

Referring back to the scale section 14 of FIG. 2 which includes a concrete deck 44, it is necessary to further consider the construction of the concrete deck in order to understand the manner in which the present invention provides deck structures which are lighter in weight, and have greater portability while providing enhanced strength. Obviously, the novel channel shaped support ribs 28 combined with the metal base plate 18 eliminate the weight which would be imparted to the structure by massive internal girder assemblies. Due to the configuration of this support rib unit, enhanced strength is imparted to portions of the scale deck section which are subjected to the maximum stress, while in areas where stress is not as great, fewer support ribs are provided, thereby reducing the weight of the overall support structure. However, even with this enhanced lightweight support structure, the composition and mass of the concrete deck 44 becomes critical. Previously known concrete decks have been poured and cured at the scale site, for these decks must incorporate thick, massive concrete layers in order to provide the necessary water resistance, chloride resistance, and wear resistance to the deck. Thus, the resultant deck section is so heavy that the cost of shipping pre-formed, pre-cured deck sections would be prohibitive. Consequently, if portability is to be feasible for a concrete deck section of the type shown in FIG. 2, the concrete deck 44 must be extremely thin to reduce weight. The combination of a thin concrete deck and the lightweight metal support ribs will then enable the deck section to be poured and cured before it is shipped to the scale site. For this to be practical, the concrete deck 44 should be within the range of from 2" to 4" thick, and previously, no concrete deck slab of this thickness would withstand the moisture, shock and chloride components prevalent in a truck scale environment.

The thin, lightweight concrete deck 44 must have high strength, abrasion resistance, and a low permeablity to preclude the infiltration of road salts and moisture. Consequently, the concrete must be very strong and very dense, and the necessary denseness and strength is acquired by using a novel combination of components. The first component is silica fume which is sold in liquid form under the trademark "FORCE 10,000" sold by W. R. Grace Company, but which is also sold under the trademark "E. M. SACK" by Elken Chemicals of Pittsburgh, Pa. This silica fume is added to the concrete mixture forming the deck 44 along with reinforced steel fibers of the type illustrated at 158 in FIG. 9. These steel fibers are sold under the trademark "DRAMIX" by Beckert Steel Wire Corporation of Irving, Tex. and, when mixed with concrete, form a mesh which reinforces a thin concrete slab without adding significant weight to the slab. It is the combination of the silica fume and the steel fibers which render feasible the formation of the thin concrete scale deck 44.

To form a thin concrete deck 44 which will withstand the conditions prevalent in a truck scale environment, the following concrete mixture has been found to be effective:

| | |
|---|---|
| Sand (fines) | 35–37% by weight |
| Course aggregate | 35–37% by weight |
| Cement | 19% by weight |
| Silica fume | 4–10% by weight |
| Steel fibers | 66–120 lbs. per cubic yard |

Ideally, about 7% by weight of silica fume and about 100 lbs. of steel fibers per cubic yard of mix are employed to form a thin concrete deck. To the mixture, a sufficient amount of water is added to form the concrete mix, but the amount of water is minimized to form a thick, dense mixture.

Referring now to FIG. 10, an alternative structure is illustrated for mounting the load button 96 upon the load cell beam 106. Here again, the load cell beam is not machined to a contour, but instead a hole 160 is drilled into the load cell beam from the flat top surface thereof. This hole extends substantially perpendicular to the flat upper surface of the load cell beam into the beam for a distance which is no greater than one-half the thickness of the beam. A pin 162 slides into the hole 160 and projects above the flat upper surface of the load cell beam. This pin projects into a hole 164 which is drilled upwardly into the load button 96 from the flat bottom surface 130 thereof. The hole 164 is substantially perpendicular to the flat bottom surface of the load button, and the pin 162 fits snugly in the holes 160 and 164. The pin holds the load button in place while permitting the flat bottom surface thereof to engage the flat upper surface of the load cell beam.

Industrial Applicability

The portable deck truck scale of the present invention operates effectively in a truck scale environment to provide accurate vehicle weights. The scale deck sections for the truck scale may be preformed and shipped to a scale site and then easily assembled upon the load cell structure for the scale. The novel force transmitting assembly for transmitting force from the scale platform to the load cell is formed to be easily mountable upon the flat surface of a load beam and to permit limited motion of the scale platform in all directions. All forces from the scale platform are transmitted directly to a flat surface of the load beam, and dirt and foreign materials are prevented from filtering into the force transmitting arrangement to adversely affect the measurement.

We claim:

1. A portable deck truck scale comprising a scale deck including at least one deck section, said deck section having first and second spaced sidewalls extending between spaced end walls and including a top deck assembly, bottom plate means spaced from said top deck assembly and a metal support means positioned between and joined to said top deck assembly and bottom plate means, said metal support means including "V"-shaped support beams extending longitudinally of said deck section between said spaced end walls substantially across the extent of said deck section between said first and second sidewalls, each said "V"-shaped support beam having an apex which is joined to either said top deck assembly or said bottom plate means and beam sidewalls which extend angularly away from said apex to form an apex angle at said apex, the apex angle of a plurality of said support beams adjacent to each of said first and second spaced sidewalls being less than the apex angle of the remaining support beams, load cell means mounted beneath said scale deck, and load transmitting means extending between said scale deck and said load cell means to transmit forces from said scale deck to said load cell means.

2. The portable deck truck scale of claim 1, wherein said deck section includes mounting means to engage said load transmitting means, said mounting means including height adjusting means engaging said load transmitting means and operative to vary the distance between said deck section and said load cell means.

3. The portable deck truck scale of claim 1, wherein said load cell means includes spaced support means and a load cell beam having a flat upper surface, said load cell beam extending between said spaced support means and being mounted thereby beneath said scale deck, said load transmitting means engaging the flat upper surface of said load cell beam.

4. The portable deck truck scale of claim 3, wherein said load transmitting means includes a load button having a flat button surface at one end thereof in contact with the flat upper surface of said load cell beam and a curved surface at an end thereof opposite to said flat surface and collar means secured to the upper flat surface of said load cell beam and surrounding said load button to retain said load button on said load cell beam.

5. The portable deck truck scale of claim 4, wherein said collar means includes a split collar having at least two separate sections secured to said load cell beam.

6. The portable deck truck scale of claim 5, wherein said load transmitting means includes an elongate rocker load pin having a flat pin end surface at a first end thereof engaging and supported by the curved surface of said load button and pin collar means disposed about the juncture between said flat pin end surface and said curved surface of said load button to retain said load pin on said load button and to permit said load pin to have limited rocking movement on the curved surface of said load button.

7. The portable deck truck scale of claim 1, wherein said top deck assembly includes metal pan means, said "V"-shaped support means being secured to said metal pan means, and a concrete deck supported by said metal pan means.

8. The portable deck truck scale of claim 7, wherein said concrete deck is within a range of from 2 inches to 4 inches in thickness.

9. The portable deck truck scale of claim 7, wherein said concrete deck is formed from concrete mixed with silica fume and reinforced with metal fibers.

10. The portable deck truck scale of claim 9, wherein said concrete deck is formed from a mix including 35% to 37% by weight of sand, 35% to 37% by weight of course aggregate, 19% by weight of cement, 4% to 10% by weight of silica fume, and 66 to 120 pounds per cubic yard of metal fibers.

11. The portable deck truck scale of claim 1, wherein said top deck assembly includes a top plate means, said "V"-shaped support means being secured to said top plate means.

12. The portable deck truck scale of claim 11, wherein said top deck assembly includes reinforcing metal strips secured to said top plate means and extending longitudinally of said deck section, said reinforcing metal strips being positioned above the support beams having the smaller apex angles.

13. The portable deck truck scale of claim 1 which includes at least one central deck section and at least one end deck section on either side of said central deck section, said end and central deck sections being interconnected, the top deck assembly for each said end and central deck sections including a top plate means, said "V"-shaped support means being secured to said top plate means, and the top deck assembly for said central deck section including reinforcing metal strips secured to said top plate means and extending longitudinally of said central deck section, said reinforcing metal strips being positioned above the support beams having the smaller apex angles.

14. A truck scale comprising a scale deck assembly, load cell means mounted beneath said scale deck assembly, said load cell means including spaced support means and a load cell beam having a flat upper surface, said load cell beam extending between said spaced support means and being mounted thereby beneath said scale deck assembly, and load transmitting means extending between said scale deck assembly and the flat upper surface of said load cell beam, said load transmitting means including a load button having a flat bottom surface at one end thereof in contact with the flat upper surface of said load cell beam and a curved surface at an end thereof opposite to said flat surface and collar means secured to the upper flat surface of said load cell beam and surrounding said load button to retain said load button on said load cell beam.

15. The truck scale of claim 14, wherein said collar means includes a split collar having at least two separate sections secured to said load cell beam.

16. The truck scale of claim 15, wherein said load transmitting means includes an elongate rocker load pin having a flat pin end surface at a first end thereof engaging and supported by the curved surface of said load button and pin collar means disposed about the juncture between said flat pin end surface and said curved surface of said load button to retain said load pin on said load button and to permit said load pin to have limited rocking movement on the curved surface of said load button.

17. The truck scale of claim 16, wherein said scale deck assembly includes platform mounting means for engaging said elongate rocker load pin, said mounting means including a flat pin engaging surface, said elongate rocker load pin having a curved pin end surface spaced from said flat pin end surface, said curved pin end surface engaging said flat pin engaging surface.

18. The truck scale of claim 17, wherein said mounting means is adjustable to vary the distance between said scale deck assembly and said load cell means.

* * * * *